(12) United States Patent
Menezes et al.

(10) Patent No.: US 8,713,589 B2
(45) Date of Patent: Apr. 29, 2014

(54) REGISTRATION AND NETWORK ACCESS CONTROL

(75) Inventors: Ryan S. Menezes, Woodinville, WA (US); Taroon Mandhana, Seattle, WA (US); Shankar Seal, Bothell, WA (US); Dhiraj P. Gandhi, Bellevue, WA (US); Aaron Wesley Cunningham, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 603 days.

(21) Appl. No.: 12/978,158

(22) Filed: Dec. 23, 2010

(65) Prior Publication Data

US 2012/0167185 A1 Jun. 28, 2012

(51) Int. Cl.
*H04L 29/06* (2006.01)

(52) U.S. Cl.
USPC .......................................................... 725/5

(58) Field of Classification Search
CPC .......................... H04L 63/0876; H04L 9/3213
USPC .......................................................... 726/5
See application file for complete search history.

(56) References Cited

U.S. PATENT DOCUMENTS

| | | | |
|---|---|---|---|
| 2004/0153667 A1* | 8/2004 | Kastelewicz et al. | 713/201 |
| 2005/0044377 A1* | 2/2005 | Huang | 713/182 |
| 2009/0164778 A1* | 6/2009 | Chaudhry | 713/159 |
| 2009/0217048 A1* | 8/2009 | Smith | 713/176 |
| 2010/0122333 A1 | 5/2010 | Noe | |
| 2010/0161759 A1 | 6/2010 | Brand | |
| 2010/0185871 A1* | 7/2010 | Scherrer et al. | 713/186 |

OTHER PUBLICATIONS

Johnston, Stuart J., "Windows Azure Gains Single Sign-On Support", Retrieved at << http://itmanagement.earthweb.com/netsys/article.php/3897451/Windows-Azure-Gains-Single-Sign-On-Support.htm >>, Aug. 9, 2010, pp. 4.

"Amazon Web Services Launches Virtual Private Cloud Service in Europe", Retrieved at << http://s1.securityweek.com/content/amazon-web-services-launches-virtual-private-cloud-service-europe >>, May 4, 2010, pp. 6.

Basking Ridge, N.J., "Verizon and Novell Unveil Cloud-Based Security Solution", Retrieved at << http://www.novell.com/news/press/verizon-and-novell-unveil-cloud-based-security-solution >>, Apr. 28, 2010, pp. 2.

"Virtela Cloud-Based Remote Access Solution Named Global Product Excellence Finalist", Retrieved at << http://www.virtela.net/press-room/press-releases/2010/virtela-cloud-based-remote-access-solution-named-global-product-excellence-finalist >>, Feb. 17, 2010, pp. 3.

(Continued)

*Primary Examiner* — Michael S McNally
(74) *Attorney, Agent, or Firm* — Andrew Sanders; Micky Minhas

(57) ABSTRACT

In embodiments of registration and network access control, an initially unconfigured network interface device can be registered and configured as an interface to a public network for a client device. In another embodiment, a network interface device can receive a network access request from a client device to access a secure network utilizing extensible authentication protocol (EAP), and the request is communicated to an authentication service to authenticate a user of the client device based on user credentials. In another embodiment, a network interface device can receive a network access request from a client device to access a Web site in a public network utilizing a universal access method (UAM), and the request is redirected to the authentication service to authenticate a user of the client device based on user credentials.

20 Claims, 10 Drawing Sheets

(56) References Cited

OTHER PUBLICATIONS

"Identity-Based Networks: Pathway to Cloud Computing", Retrieved at << http://www.cisco.com/web/strategy/docs/gov/fedbiz11310IBN.pdf >>, 2010, pp. 2.

"Using DirectAccess to Provide Secure Access to Corporate Resources from Anywhere", Retrieved at << http://www.google.co.in/url?sa=t&source=web&cd=6&ved=0CDcQFjAF&url=http%3A%2F%2Fdownload.microsoft.com%2Fdownload%2FC%2F8%2FB%2FC8BADAC7-AE95-4FE8-996E-91D883F74159%2F0712 DirectAccessTCS.pdf&ei=Wdh0TPSoAcfKjAf29pmvBg&usg=AFQjCNHMKNIIKZffkFaRyBpme5pR4PoElg&sig2=18NSh_LZacKNTeD4QDLYPQ >>, May 2009, pp. 1-9.

"Authentication Integration with Single Sign-On", Retrieved at << http://www.ciscosystems.com/en/US/prod/collateral/vpndevc/ps5707/ps8418/ps6128/product_data_sheet0900aecd802da1b5.html >>, Retrieved Date: Aug. 26, 2010, pp. 4.

"Authentication: The next factor in cloud based security services", CRYPTOCard White Paper—Available at http://www.cryptocard.com/doc/WP A4 Cloud/Whitepaper.pdf<, (Feb. 2009), 4 pages.

* cited by examiner

REGISTRATION AND NETWORK ACCESS CONTROL

BACKGROUND

As mobile devices, such as portable computers and mobile phones, continue to become more popular and users have multiple devices, there is an increasing move towards having one global digital identity which can be used when roaming and for guest network access, as well as for a network single sign-on experience. Typically, a user has different passphrases and keys for home network access, and businesses setup temporary guest accounts for visitor access, or provide open, unsecure networks for guest access. Mobile users typically have to remember multiple passwords and identities per site, such as when business or academic users travel to different cities or campuses. Hotspot providers, such as hotels, coffee shops, and airports subscribe to expensive monthly services for configuring and maintaining networks that provide Internet access to travelers, guests, and customers.

A network access server (NAS) traditionally uses RADIUS servers for authentication and authorization decisions based on a user account database or directory for an organization, and is normally associated with and managed within a single security domain. Cross-domain authentication can be accomplished using realm-based routing at a proxy Radius server, but this limits providing a user with a single sign-on across security trust domains.

SUMMARY

This summary is provided to introduce simplified concepts of registration and network access control that is further described below in the Detailed Description. This summary is not intended to identify essential features of the claimed subject matter, nor is it intended for use in determining the scope of the claimed subject matter.

Embodiments of registration and network access control are described. In embodiments, an initially unconfigured network interface device can be registered with a device management service and configured as an interface to a public network for a client device. An encrypted token is received at the network interface device from an authentication service that authenticates user credentials received from the client device. The network interface device passes the encrypted token to the client device as part of the message from the authentication service, such as a message script that initiates the client device being automatically redirected to a device management service. A device management information request directed to the client device is then received from the device management service, and the device management information request is communicated to the client device. Identification of the network interface device is received from the client device in response to the device management information request, and the identification of the network interface device is communicated to the device management service.

Encrypted management data directed to the client device is then received from the device management service, and the encrypted management data is communicated to the client device. The network interface device then receives the encrypted token and the encrypted management data from the client device. The network interface device posts the encrypted token, the encrypted management data, and the identification of the network interface device to the device management service that registers the network interface device and generates a unique device identifier corresponding to the network interface device. The network interface device then receives the unique device identifier for the network interface device from the device management service, and the network interface device is registered.

In other embodiments of registration and network access control, a network interface device receives a network access request from a client device to access a secure network utilizing an extensible authentication protocol (EAP). The network interface device facilitates client device communication with the authentication service, and the client device communicates an identity response to the authentication service, where the identity response includes a username or any other type of identity received from the client device. A security token request directed to the authentication service is received from the client device, and the security token request is communicated to the authentication service.

An encrypted token that includes a response to the security token request and a proof key is received at the network interface device directed to the client device from the authentication service. The encrypted token that is received from the authentication service is communicated to the client device that stores the proof key. The network interface device then receives the encrypted token and a random number from the client device, and communicates a validation request to the network authorization service, where the validation request includes an encrypted security token (which contains both the encrypted token and the proof key), the random number, and a device identifier of the network interface device. The network interface device receives validation from the network authorization service, where the validation includes a master session key generated by the network authorization service, and the validation indicates to the network interface device that the client device is allowed access to the secure network. The client device can derive the master key from the encrypted security token response (e.g., the proof key that the client device received and stored) that is received from the authentication service, and the client device and network interface device can then communicate data using the master key.

In other embodiments of registration and network access control, a network interface device receives a network access request from a client device to access a Web site in a public network utilizing a universal access method (UAM). The network interface device replies to the client device with a redirect to an authentication service. A credential request directed to the client device is received from the authentication service, and the credential request is communicated to the client device. User credentials directed to the authentication service are received from the client device, and the user credentials are communicated to the authentication service.

An encrypted token directed to the client device is received from the authentication service, and the encrypted token is communicated to the client device. The encrypted token can then be posted back to the network interface device from the client device. The network interface device communicates a validation request to a network authorization service, and the validation request includes the encrypted token and a device identifier of the network interface device. The network interface device then receives validation from the network authorization service, and the validation indicates to the network interface device that the client device is allowed access to the public network. The network interface device then communicates a redirect to the client device to access the initially requested Web site in the public network.

BRIEF DESCRIPTION OF THE DRAWINGS

Embodiments of registration and network access control are described with reference to the following drawings. The same numbers are used throughout the drawings to reference like features and components.

DETAILED DESCRIPTION

Registration and network access control is described. In embodiments, network access via a network interface device to a public network and/or network access to a secure network is simplified, yet still provides the owner of a network with control over who connects to it. Additionally, a corporate network can control authorization, yet delegate authentication to an on-line authentication provider. Hotspot providers, such as hotels, coffee shops, and airports, can limit network configuration and management overhead. Home users can provide guest access to friends and relatives based on easily remembered identities, such as email addresses, and not have to share network logon passphrases. Network access can also be granted to a secured network using cloud-based authentication provider and authorization provider services.

While features and concepts of the described systems and methods for registration and network access control can be implemented in any number of different environments, systems, devices, and/or various configurations, embodiments of registration and network access control are described in the context of the following example devices, systems, and configurations.

Figure 1:
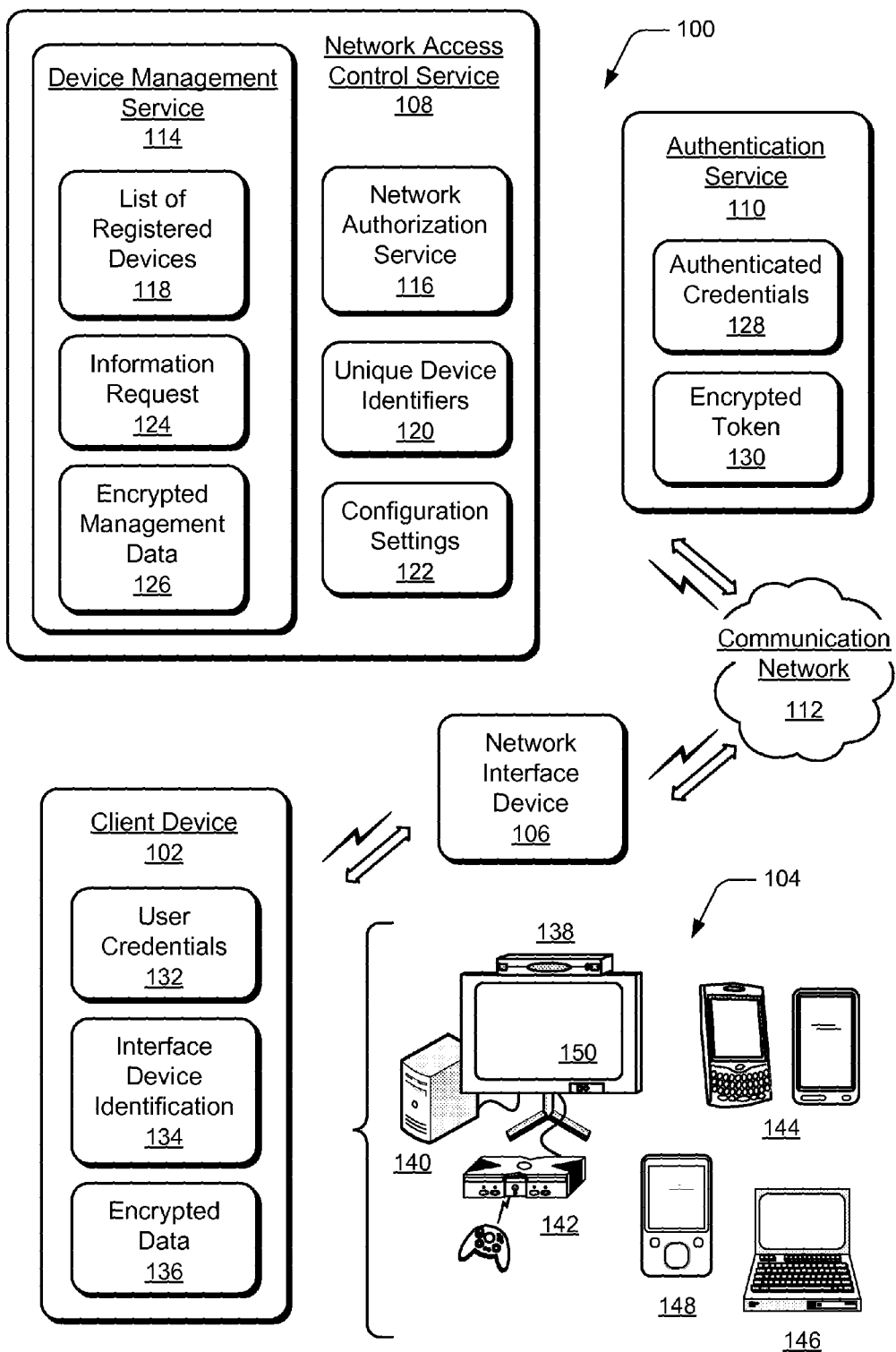
FIG. 1 illustrates an example system in which embodiments of registration and network access control can be implemented.

FIG. 1 illustrates an example system 100 in which various embodiments of registration and network access control can be implemented, such as for device registration. The example system 100 includes a client device 102, which may be configured as any type of client device 104. Some of the various client devices include wired and/or wireless devices, and may also be referred to as user devices and/or portable devices. The example system 100 also includes a network interface device 106, a network access control service 108, and an authentication service 110.

Any of the services and devices can communicate via a communication network 112, which can be implemented to include a wired and/or a wireless network that facilitates data communication. The communication network may be a public network, such as the Internet, or may be implemented as a secure, private, and/or enterprise network. The communication network can also be implemented using any type of network topology and/or communication protocol, and can be represented or otherwise implemented as a combination of two or more networks. The communication network may also include mobile operator networks that are managed by mobile operators, such as a communication service provider, cell-phone provider, and/or Internet service provider. A mobile operator can facilitate mobile data and/or voice communication for any type of a wireless device or mobile phone (e.g., cellular, VoIP, Wi-Fi, etc.).

In various embodiments, the network access control service 108 includes a device management service 114 and/or a network authorization service 116. Each of the services can be implemented as computer-executable instructions, such as a software application, and executed by one or more processors to implement the various embodiments described herein. The network access control service can also be implemented with any number and combination of differing components as further described with reference to the example device shown in FIG. 10. Additionally, the device management service and/or the network authorization service may be implemented as an independent service separate from the network access control service (e.g., on a separate server, by a third party service, or on a client device). In implementations, the device management service 114 and/or the network authorization service 116 are trusted services to the authentication service 110. The three services can be implemented as pre-existing trust services in the example system 100. Alternatively or in addition, the authentication service, the network authorization service, and the device management service can be implemented as SOAP (Simple Object Access Protocol) Web services.

The network interface device 106 is an example of a network access point or network access server (NAS) that may be implemented in a home or small business. In embodiments of registration and network access control, a network interface device that is initially unconfigured when purchased from an electronics store or provided by an Internet service provider (ISP) can be registered in a list of registered devices 118 with the device management service 114. The network interface device can be registered with the device management service using secure Internet protocols. The network interface device can also be uniquely identified globally at the network access control service 108 with a unique device identifier 120, such as a Globally Unique Identifier (GUID), a certificate assigned by the authentication service 110, or any other type of unique identifier. Along with registration of the network interface device, the network access control service 108 may include configuration settings 122 for the network interface device, and the configuration settings can be published to the network interface device.

In an example of registering an initially unconfigured network interface device, a user may purchase a new Wi-Fi router for home or business use. The user can then initiate connecting to the router for the first time with a client device, such as a mobile phone or portable computer. In embodiments, legacy and browser only client devices can be used to initially register and configure a network interface device, thus eliminating the need for specific client software. The initially unconfigured router can redirect the user to a sign-in page where user credentials (e.g., username and password)

are entered. The user is then directed to a setup page and enters identification of the network interface device, such as an identification number on the device or a security number provided with the device. The user may also provide a name for the device and initial configuration settings. When the setup information is submitted to the network access control service 108, the client device can then securely connect to the network interface device.

The user may also then access the device management service 114 from a client device and grant Internet access via the network interface device to other designated users, such as the user contacts in an email address book. A visitor to the user's home or business can provide email login credentials, and then be granted network access for connection through the Wi-Fi router. In embodiments, the device management service 114 may also initiate an information request 124 to a client device, and communicate encrypted management data 126 to the client device. The information requests from the device management service, as well as the encrypted management data, are further described with reference to device registration in FIGS. 2 and 3.

The network authorization service 116 is an example of a Web-based authorization service or a .Net access service that may serve to uniquely identify multiple network interface devices and maintain access control rules for each of the network interface devices. The network authorization service can also maintain an access control list for each of the network interface devices that are uniquely identified to the service. The network authorization service is further described with reference to client device network access in FIGS. 4-8.

The authentication service 110 is an example of a trusted third-party identity provider, identification control service, and/or a security token service that can communicate authentication messages over secure Web protocols, such as HTTPS, and verify user credentials. In embodiments, the authentication service is implemented to authenticate credentials 128 and communicate an encrypted token 130 to the client device. The authenticated credentials, as well as the encrypted token, are further described with reference to device registration in FIGS. 2 and 3, and with reference to client device network access in FIGS. 4-8. In embodiments, the network access control service 108, authentication service 110, device management service 114, and network authorization service 116 in the example system 100 are trusted services. The trusted services all trust communications received from the other services for device registration, user authentication, and/or authorization for network access. For example, the authentication service 110 can encrypt information that is only decrypted by the device management service 114, such as the encrypted token 130 that is routed from the authentication service to the client device 102, which is then redirected to the device management service.

Any of the various client devices 104 can be configured as the client device 102, and may be implemented with any number and combination of differing components as further described with reference to the example device shown in FIG. 10. The client device 102 can include user credentials 132, such as a username and password, that are associated with a user of the device. The client device can also include interface device identification 134 of the network interface device 106, such as an identification number, a serial number, a physical identifier, a security number provided with the device, and/or a provided number and password combination to initially setup the network interface device. The client device can also receive and maintain encrypted data 136 that is received from the device management service 114, and utilized for registration of the network interface device 106 as further described with reference to device registration in FIGS. 2 and 3.

In this example system 100, a client device 104 can be implemented as any one or combination of a television client device 138, a computer device 140, a gaming system 142, an appliance device, an electronic device, and/or as any other type of device. The various client devices can also include wireless devices implemented to receive and/or communicate wireless data, such as any one or combination of a mobile phone 144 (e.g., cellular, VoIP, WiFi, etc.), a portable computer device 146, a media player device 148, and/or any other wireless device. A client system can include a respective client device and display device 150 that together render email messages for display. The display device can be implemented as any type of a television, high definition television (HDTV), LCD, or similar display system.

Example methods 200, 500, and 700 are described with reference to respective FIGS. 2, 5, and 7 in accordance with one or more embodiments of registration and network access control. Generally, any of the functions, methods, procedures, components, and modules described herein can be implemented using software, firmware, hardware (e.g., fixed logic circuitry), manual processing, or any combination thereof. A software implementation represents program code that performs specified tasks when executed by a computer processor. The example methods may be described in the general context of computer-executable instructions, which can include software, applications, routines, programs, objects, components, data structures, procedures, modules, functions, and the like. The program code can be stored in one or more computer-readable memory devices, both local and/or remote to a computer processor. The methods may also be practiced in a distributed computing environment by multiple computer devices. Further, the features described herein are platform-independent and can be implemented on a variety of computing platforms having a variety of processors.

Figure 2:
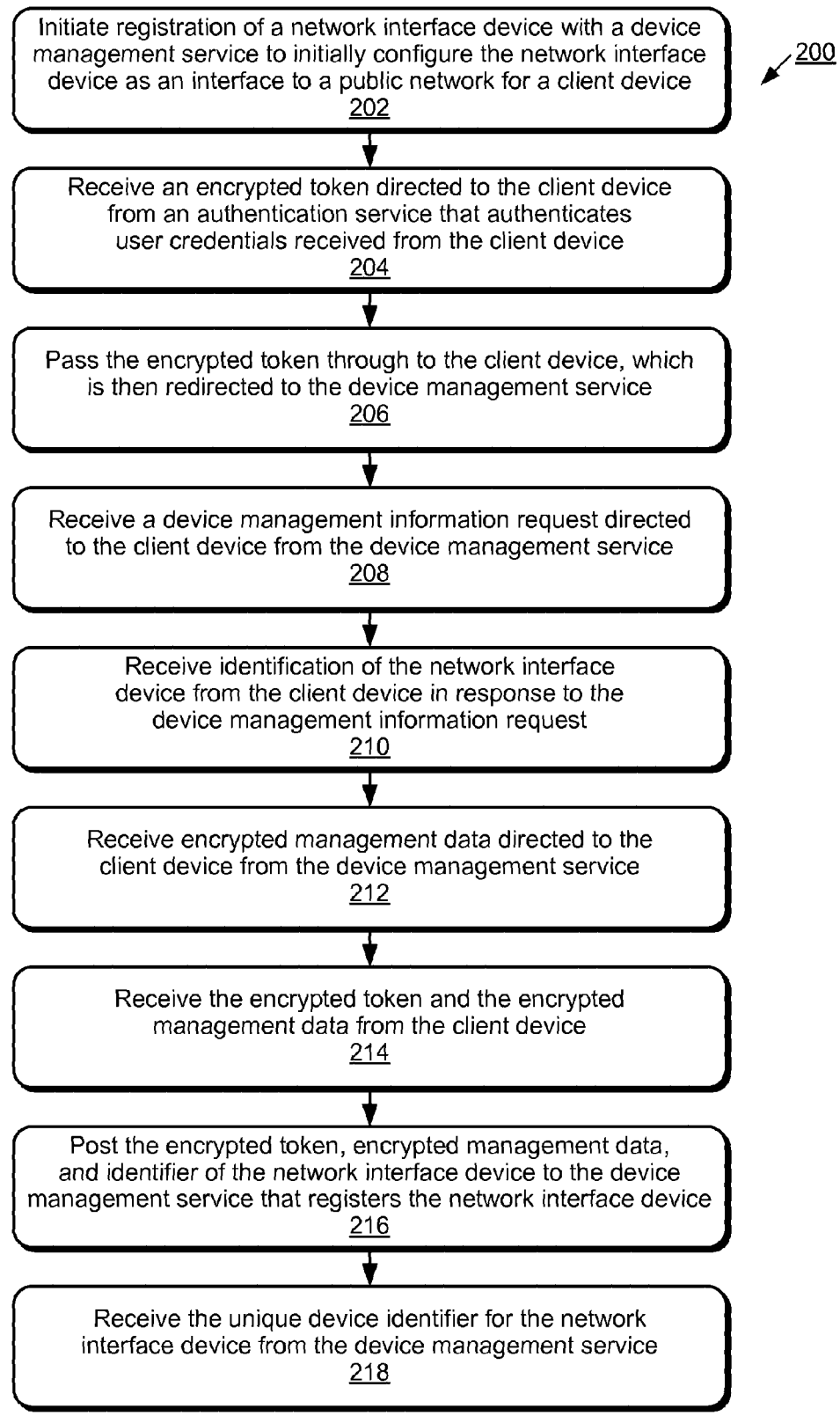
FIG. 2 illustrates example method(s) of registration and network access control in accordance with one or more embodiments.

FIG. 2 illustrates example method(s) 200 of registration and network access control, and is described with reference to a network interface device that is initially unconfigured and registered with the device management service. The order in which the method blocks are described are not intended to be construed as a limitation, and any number of the described method blocks can be combined in any order to implement a method, or an alternate method.

At block 202, registration of a network interface device with a device management service is initiated to initially configure the network interface device as an interface to a public network for a client device. For example, the network interface device 106 (FIG. 1) receives a request from the client device 102 to connect to a public network, such as a request for an Internet home page. In an embodiment, the initially unconfigured network interface device restricts the client device access to the public network through the network interface device until the network interface device is configured and registered with the device management service 114.

Initiating registration of the network interface device includes receiving the request from the client device to connect to the public network; redirecting the request from the client device to the authentication service 110 with a URL redirect; receiving a credential request directed to the client device from the authentication service, the credential request passed through the network interface device or communicated directly to the client device; and receiving user credentials 132 directed to the authentication service from the client device, the user credentials passed through the network interface device or communicated directly to the authentication service. The user credentials can include a username and password combination utilized for authentication by the authentication service, and the user credentials may be associated with the unique device identifier 120 for the network interface device at the device management service.

At block 204, an encrypted token directed to the client device is received from the authentication service that authenticates user credentials received from the client device and, at block 206, the encrypted token is passed to the client device, which is then redirected to the device management service. For example, the network interface device 106 receives the encrypted token 130 from the authentication service 110 that authenticates the user credentials 132 received from the client device. The network interface device then passes the encrypted token through to the client device as part of the message from the authentication service, such as a message script that initiates the client device being automatically redirected to the device management service 114.

At block 208, a device management information request directed to the client device is received from the device management service, and the device management information request is communicated to the client device. For example, the network interface device 106 receives the device management information request 124, which is directed to the client device 102 from the device management service 114, and the device management information request is passed through the network interface device or communicated directly to the client device.

At block 210, identification of the network interface device is received from the client device in response to the device management information request, and the identification of the network interface device is communicated to the device management service. For example, the network interface device 106 receives the interface device identification 134 from the client device 102, and the interface device identification is passed through the network interface device or communicated directly to the device management service 114. The interface device identification can include a device identifier or a security identifier corresponding to the network interface device, such as a physical identifier or serial number of the network interface device. The interface device identification can also include configuration settings of the network interface device that are communicated from the client device to the device management service via the network interface device.

At block 212, encrypted management data directed to the client device is received from the device management service, and the encrypted management data is communicated to the client device. For example, the network interface device 106 receives the encrypted management data 126 from the device management service 114, and the encrypted management data is passed through the network interface device or communicated directly to the client device. In some implementations, the encrypted management data may be referred to as an encrypted blob or an opaque blob (that is encrypted and opaque to the network interface device). The encrypted management data is generated by the device management service and subsequently utilized by the device management service to authenticate the network interface device when the network interface device posts the encrypted management data back to the device management service.

At block 214, the encrypted token and the encrypted management data is received from the client device. For example, the network interface device 106 receives the encrypted data 136 from the client device 102, where the encrypted data 136 includes the encrypted token 130 received from the authentication service 110 and includes the encrypted management data 126 received from the device management service 114.

At block 216, the encrypted token, the encrypted management data, and the identifier of the network interface device is posted to the device management service that registers the network interface device and generates a unique device identifier corresponding to the network interface device. For example, the network interface device 106 posts the encrypted data 136 (e.g., the encrypted token 130 and the encrypted management data 126) and the interface device identification to the device management service 114 that registers the network interface device and generates a unique device identifier 120 corresponding to the network interface device.

At block 218, the unique device identifier for the network interface device is received from the device management service. For example, the network interface device 106 then receives the unique device identifier 120 from the device management service 114. An owner and/or user of the network interface device is now mapped to the unique device identifier that corresponds to the network interface device.

Figure 3:
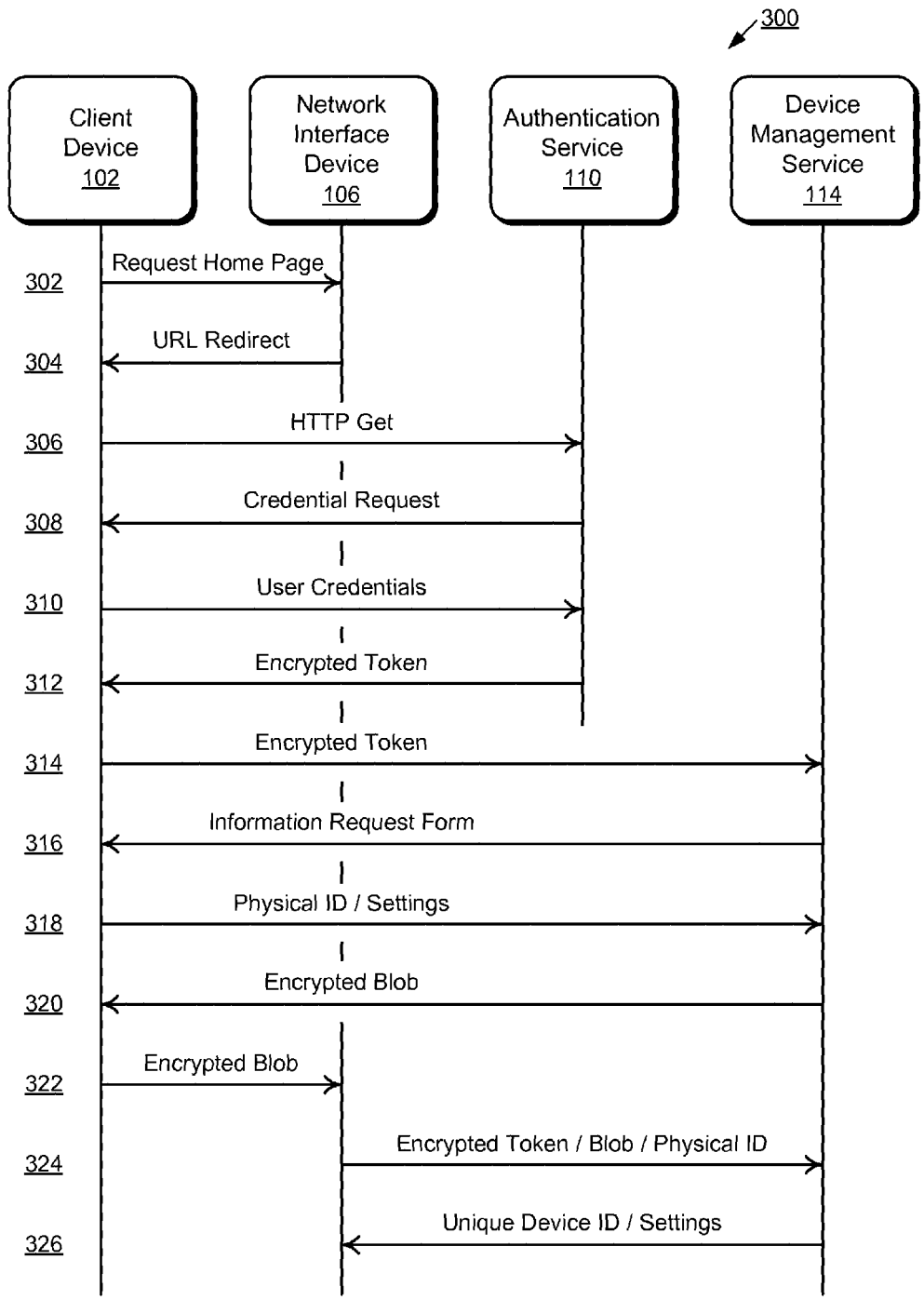
FIG. 3 is an example diagram that further illustrates data communication between devices and services described with reference to FIGS. 1 and 2 in accordance with one or more embodiments.

FIG. 3 is an example diagram 300 that further illustrates the data communication between the various devices and services described with reference to FIGS. 1 and 2. The example diagram includes the client device 102, the network interface device 106, the authentication service 110, and the device management service 114, as well as a sequence of the data communication between the devices and services for device registration.

At 302, the client device communicates a request to the network interface device for an Internet home page. At 304, the network interface device redirects the request from the client device to the authentication service with a URL redirect. At 306, the client device communicates the redirected request as an HTTP GET to the authentication service. At 308, the authentication service communicates a credential request directed to the client device. The credential request may be passed through the network interface device, or communicated directly to the client device via an alternate communication link. At 310, the client device communicates user credentials as an HTTPS POST to the authentication service, and the user credentials are passed through the network interface device or communicated directly to the authentication service via the alternate communication link. At 312, the authentication service authenticates the user credentials and communicates an encrypted token as an HTTP Response to the client device. The network interface device passes the encrypted token through to the client device as part of the message from the authentication service, such as a message script that initiates the client device being automatically redirected to the device management service.

At 314, the redirected encrypted token is communicated as an HTTP Get to the device management service. At 316, the device management service communicates an information request form to the client device, and the information request form is passed through the network interface device or communicated directly to the client device via an alternate communication link. At 318, the client device communicates identification of the network interface device (also referred to as a NAS) (i.e., NAS physical ID) and configuration settings of the network interface device to the device management service as an HTTPS Post. The NAS physical ID and the configuration settings may be communicated through the network interface device or communicated directly to the device management service via an alternate communication link. At 320, the device management service communicates an encrypted blob as an HTTP Response to the client device, and the encrypted blob can be passed through the network interface device. The encrypted blob may also be commonly referred to as an opaque blob that is encrypted and, therefore, opaque to the network interface device.

At 322, the client device redirects the encrypted blob along with the encrypted token as an HTTP Post to the network interface device. At 324, the network interface device communicates the encrypted token, encrypted blob, and NAS physical ID as an HTTPS Post to the device management service. At 326, the device management service registers the network interface device, generates a unique device identifier corresponding to the network interface device, and communicates the unique device identifier to the network interface device, along with optional device settings. An owner and/or user of the network interface device is now mapped to the unique device identifier that corresponds to the network interface device.

Figure 4:
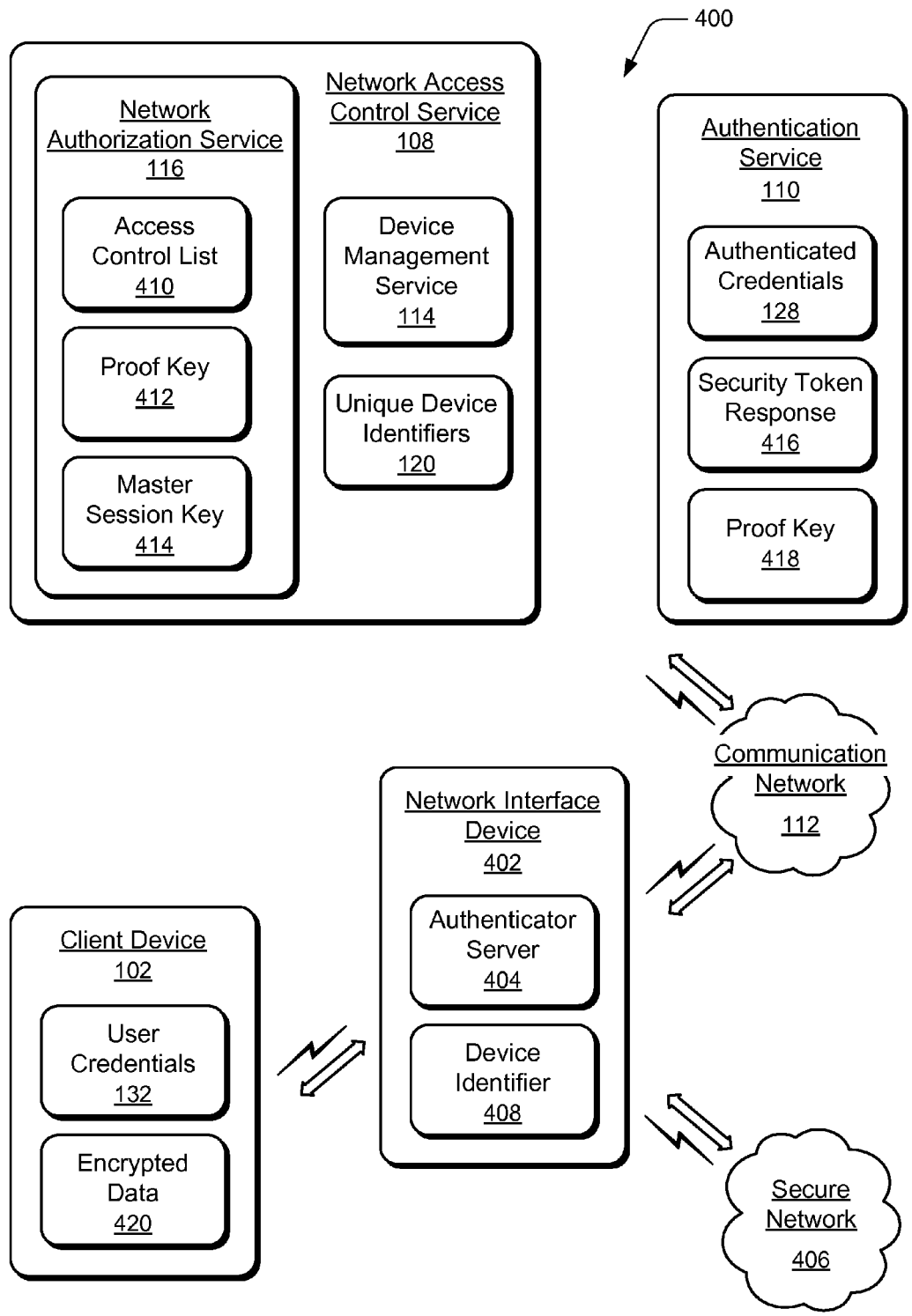
FIG. 4 illustrates another example system in which embodiments of registration and network access control can be implemented.

FIG. 4 illustrates another example system 400 in which various embodiments of registration and network access control can be implemented, such as for client device network access. The example system 400 includes the client device 102, the network access control service 108, and the authentication service 110 as described with reference to FIG. 1. Any of the services and devices can communicate via the communication network 112, which is also described with reference to FIG. 1. Additionally, the device management service 114 and/or the network authorization service 116 can be configured as trusted services to the authentication service 110, as described with reference to FIG. 1.

In a first network access scenario, the client device 102 may be a portable computer configured with client software that utilizes an extensible authentication protocol (EAP) method for network access. For example, an employee from a first company may be visiting a second company, open a Wi-Fi configured portable computer, and be automatically connected to a guest network of the second company with seamless authentication. The guest network of the second company can utilize an on-line identity provider that uses employee credentials to federate with servers belonging to the first company and authenticate the employee. If the second company has a defined access control policy that allows employees of the first company network access, then the portable computer of the employee is connected to the guest network of the second company. Network access for an EAP-configured client device is described with reference to FIGS. 5 and 6.

In a second network access scenario, the client device 102 may be a mobile phone or limited device configured only with a browser and requests network access, such as via a hotspot provider that implements a captive portal solution, also referred to as a universal access method (UAM). The client device can be allowed HTTP communication redirected to the authentication service to authenticate the client device. For example, a small business owner can provide Internet access for customers via a wireless network interface device that is registered with an on-line provider. The business owner can then access an access control page for the network interface device and grant (or deny) network access for specific email addresses associated with customers of the business. Network access for a client device via a UAM is described with reference to FIGS. 7 and 8.

The example system 400 also includes a network interface device 402 that includes an authenticator server 404, which may be implemented as an extensible authentication protocol (EAP) authenticator. Additionally, the network interface device may be implemented as a RADIUS server, or with a RADIUS server (not shown). In a corporate or larger business environment, a network interface device (also referred to as a network access server (NAS)) may be configured with an existing RADIUS server, and the authenticator server (EAP authenticator) can be registered as described above with reference to FIGS. 1-3. In an enterprise scenario, the authenticator server and Radius server can be located on a separate server device.

The network interface device 402 is an interface for the client device to a secure network 406, such as a private business, corporate, and/or enterprise network. Prior to authentication, the network interface device restricts client device access to the secure network, and provides access to the authentication service 110 to request a security token. The authenticator server 404 at the network interface device can communicate with the authentication service 110 and the network authorization service 116 over HTTPS channels via the communication network 112. The network interface device also includes a device identifier 408 that identifies the network interface device to the network access control service 108 and/or to the network authorization service 116.

As described with reference to FIG. 1, the network access control service 108 includes the device management service 114 and/or the network authorization service 116. The network interface device 402 can also be registered and uniquely identified globally at the network access control service 108 with a unique device identifier 120, such as a Globally Unique Identifier (GUID), a certificate assigned by the authentication service 110, or any other type of unique identifier.

The network authorization service 116 is an example of a Web-based authorization service or a .Net access service that may serve to uniquely identify multiple network interface devices and maintain access control rules for each of the network interface devices. The network authorization service manages an access control list 410 that includes identity rules for the network interface device 402. In embodiments, the network authorization service may also receive a proof key 412 from the authentication service 110, and generate a master session key 414. The network authorization service, as well as the proof key and the master session key, are further described with reference to client device network access in FIGS. 5-8.

The authentication service 110 is an example of a trusted third-party identity provider, identification control service, and/or a security token service that can communicate authentication messages over secure Web protocols, such as HTTPS, and verify user credentials. In embodiments, the authentication service is implemented to authenticate credentials 128, and authentication may include security token acquisition from the authentication service, such as a security token response 416 to the client device. The authentication service can issue the client device a signed security token, and may also issue a proof key 418, such as a proof-of-possession token (POP), that is used at the client device to demonstrate authorized use of a signed security token. An identity claim can then be used to lookup the access control list 410 for a particular network interface device. A security token response and proof key are further described with reference to device registration in FIG. 2, and with reference to client device network access in FIGS. 5-8.

The client device 102 can include the user credentials 132, such as a username and password, that are associated with a user of the device. The client device can also receive and maintain encrypted data 420 that is received from the authentication service 110, such as the security token response 416 and the proof key 418 as further described with reference to client device network access in FIGS. 5-8.

Figure 5:
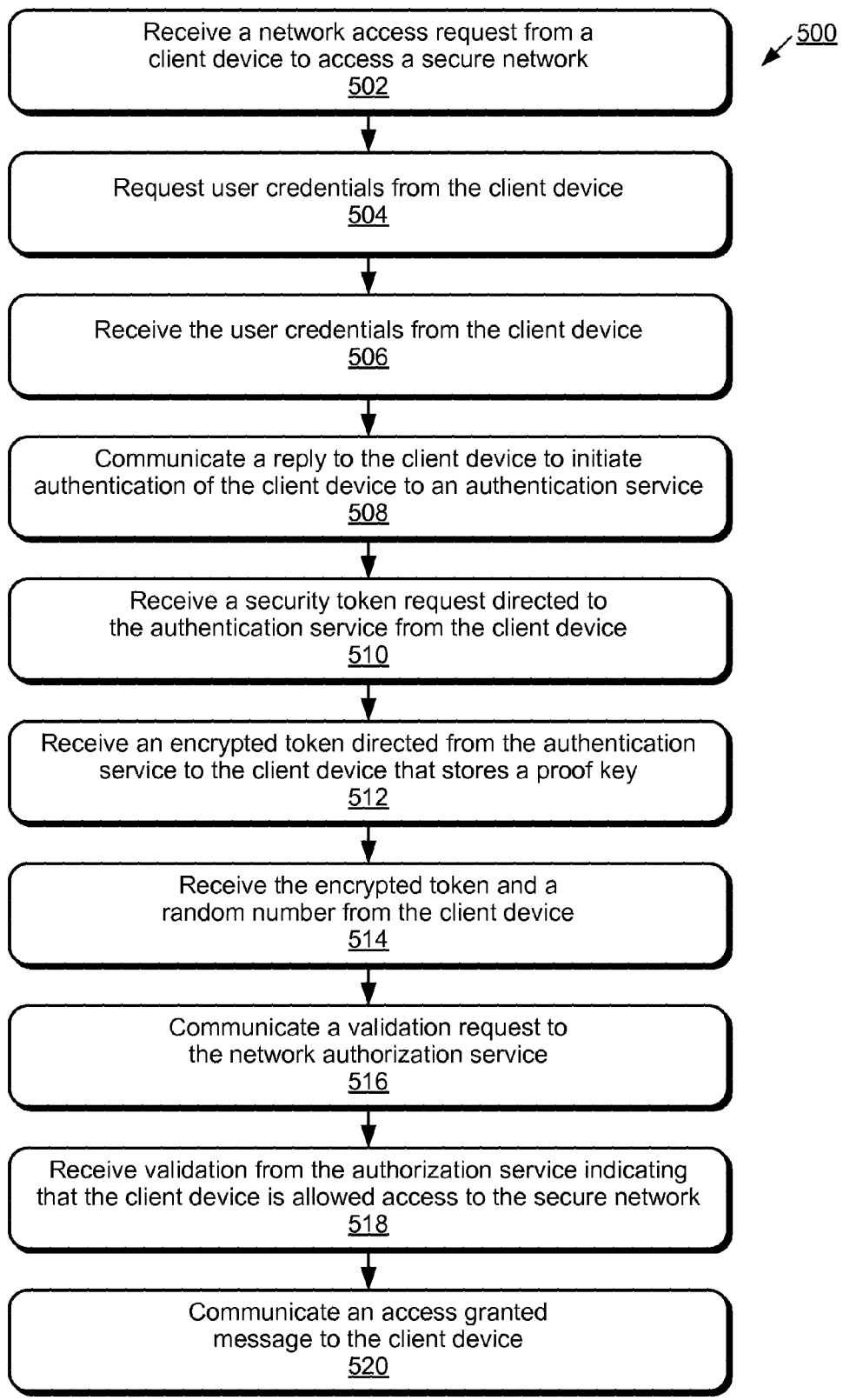
FIG. 5 illustrates example method(s) of registration and network access control in accordance with one or more embodiments.

FIG. 5 illustrates example method(s) 500 of registration and network access control, and is described with reference to a network interface device that includes an authenticator server. The order in which the method blocks are described are not intended to be construed as a limitation, and any number of the described method blocks can be combined in any order to implement a method, or an alternate method.

At block 502, a network access request is received from a client device to access a secure network. For example, the network interface device 402 receives a network access request from the client device 102 to access the secure network 406. At block 504, user credentials are requested from the client device and, at block 506, the user credentials are received from the client device. For example, the authenticator server 404 at the network interface device 402 requests the user credentials 132 from the client device, and the network interface device then receives the user credentials from the client device, such as a username and password combination utilized for authentication by the authentication service 110. In embodiments, the authenticator server 404 implemented by the network interface device is an extensible authentication protocol (EAP) authenticator, and the client device is configured for EAP communication.

At block 508, a reply is communicated to the client device as a proxy to an authentication service to initiate authentication of the client device to the authentication service. For example, the authenticator server 404 at the network interface device 402 replies to the client device 102, and an identity response is communicated to the authentication service 110, which then communicates with the client device. The reply from the network interface device can initiate various EAP session communications between the client device and the authentication service. For example, an initial server greeting certificate (also referred to as a server hello certificate) is directed to the client device from the authentication service to set up a secure tunnel for communication. The network interface device can communicate the initial certificate to the client device, or the initial certificate can be communicated via an alternate communication link. The network interface device then receives key exchange and change cipher spec messages directed to the authentication service from the client device, and the network interface device communicates the key exchange and change cipher spec messages to the authentication service. A change cipher spec message directed to the client device is received from the authentication service, and the change cipher spec message is communicated to the client device via the network interface device. After the change cipher spec message is received at the client device from the authentication service, a secure channel is established between the client device and the authentication service. All of the subsequent communications between the authentication service and the client device are encrypted, and the network interface device continues to pass through the encrypted communications without access to the content of the packet exchanges. This is further described below as a transport layer security (TLS) handshake with reference to the data communications shown in FIG. 6.

At block 510, a security token request directed to the authentication service is received from the client device, and the security token request is communicated to the authentication service. For example, the network interface device 402 receives a security token request from the client device 102 on behalf of a user of the client device, and the security token request is communicated to the authentication service 110.

At block 512, an encrypted token is received that includes a response to the security token request and a proof key, the encrypted token directed from the authentication service to the client device that stores the proof key. For example, the network interface device 402 receives an encrypted token directed to the client device 102 from the authentication service 110, where the encrypted token includes the security token response 416 and the proof key 418. The client device 102 that stores the proof key 418 as encrypted data 420 along with the security token response 416. The client device can utilize the proof key as "proof of possession" to the network authorization service that the client device is the legitimate owner of the encrypted token. In embodiments, the proof key is a shared secret between the client device and the network authorization service, and the client device can use the proof key to derive a master session key without transmitting it to the network authorization service or vice-versa.

At block 514, the encrypted token and a random number are received from the client device. For example, the network interface device 402 receives a random number (also referred to as a Nonce, used once) and the encrypted token back from the client device 102 (i.e., the encrypted token that was received by the client device from the authentication service 110 at block 512).

At block 516, a validation request is communicated to the network authorization service, the validation request including an encrypted security token, the random number, and a device identifier of the network interface device. For example, the network interface device 402 then communicates a validation request to the network authorization service 116 at the network access control service 108, and the validation request includes an encrypted security token (which contains both the encrypted token and the proof key), the random number received from the client device, and the device identifier 408 of the network interface device that is included in the validation request by the network interface device. The network interface device communicates its own device identifier so that the network authorization service can identify which device is sending the encrypted token.

At block 518, validation is received from the network authorization service, the validation including a master session key generated by the network authorization service and the validation indicating that the network interface device allow the client device access to the secure network. For example, the network interface device 402 receives validation from the network authorization service 116 that validates and decrypts the encrypted token, as well as performs an access check of the access control list 410 to verify that a user of the client device, or authenticated identity, has access to the network interface device. The network authorization service 116 then delivers the master session key 414 over an encrypted channel to the network interface device for EAP using the proof key 412, the random number, and a derivation function. The network interface device receives the master session key from the network authorization service, which indicates to the network interface device that the client device can be allowed access to the secure network 406.

At block 520, an access granted message is communicated to the client device that initiates the client device to generate a copy of the master session key utilizing the proof key and the random number. For example, the network interface device 402 communicates an access granted message to the client device 102 that then generates its own copy of the master session key utilizing the proof key and the random number. Both the client device 102 and the network interface device 402 can then independently derive a transient session key from the master session key and use it to encrypt future communication over an unsecure channel.

Figure 6:
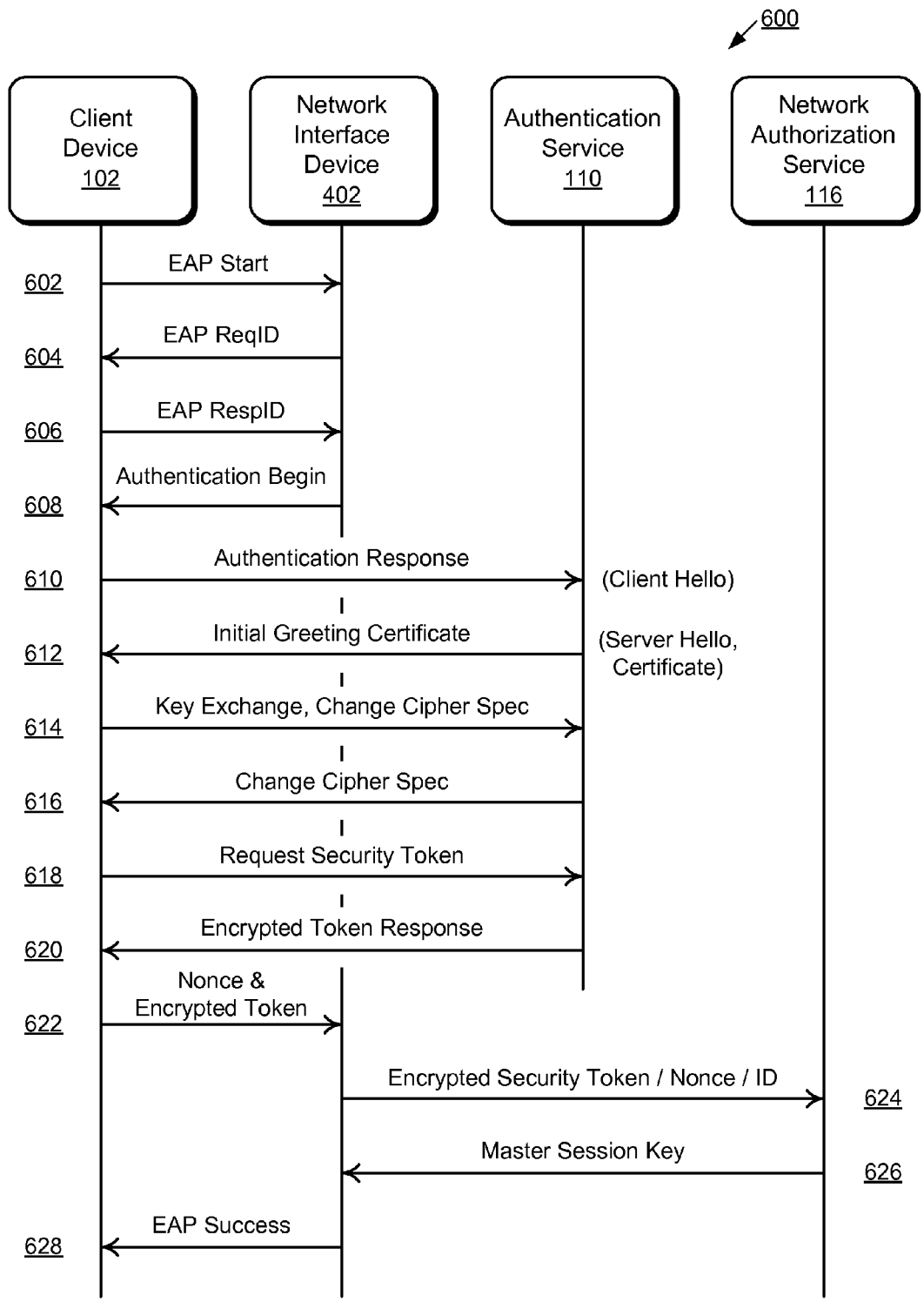
FIG. 6 is an example diagram that further illustrates data communication between devices and services described with reference to FIGS. 4 and 5 in accordance with one or more embodiments.

FIG. 6 is an example diagram 600 that further illustrates the data communication between the various devices and services described with reference to (FIGS. 4 and 5. The example diagram includes the client device 102, the network interface device 402, the authentication service 110, and the network authorization service 116, as well as a sequence of the data communication between the devices and services for client device network access utilizing EAP.

At 602, the client device communicates an EAP Start message to the network interface device, such as in the form of a network access request. At 604, the network interface device communicates an EAP ReqID message to request a user identity from the client device. At 606, the client device communicates an EAP RespID message to provide a username to the network interface device and, at 608, an authentication begin message is communicated back to the client device. At 610, the client device communicates an authentication response (also referred to as a client hello message) to the authentication service.

In embodiments, the network interface device receives the EAP RespID message from the client device, communicates the authentication begin message back to the client device, which then communicates the authentication response to the authentication service. The network interface device also receives the response back from the authentication service and converts the response to EAP messages that are communicated back to the client device. In implementations, a client device and a network interface device may be pre-configured to communicate with a designated network authorization service. For example, the client device 102 and the network interface device 402 may be pre-configured for communication with the network authorization service 116.

At 612, the authentication service communicates an initial greeting certificate (e.g., a server hello message along with a server certificate) directed to the client device, and the server certificate is used to setup a secure tunnel for communication. The server certificate can be passed through the network interface device to the client device, or communicated to the client device via an alternate communication link. At 614, the client device communicates key exchange and change cipher spec messages directed to the authentication service, and the messages are passed through the network interface device or communicated via an alternate communication link to the authentication service. At 616, the authentication service communicates a change cipher spec message directed to the client device, and the change cipher spec message is communicated through the network interface device or via an alternate communication link to the client device. A secure channel is now setup and encrypted with a key derived from the key exchange message, and the key is used to encrypt all messages.

The data communications described above in 610-616 can be implemented as a transport layer security (TLS) handshake to establish a secure communication channel between the client device and the authentication service for communications security. For example, the ClientHello message from the client device begins negotiation, and the message can include version negotiation, random number exchange, and other session information. The authentication service responds with the ServerHello message, and the message confirms protocol version and other session information. The authentication service also communicates a Certificate message, and a ServerHelloDone message to indicate that the handshake negotiation is completed. The client device responds with a ClientKeyExchange message, and a ChangeCipherSpec record to indicate to the authentication service that all subsequent communications from the client device will be authenticated, and encrypted if encryption parameters were established. The client device also communicates a encrypted Finished message. The authentication service also communicates a ChangeCipherSpec to the client device, and an authenticated and encrypted Finished message. The TLS handshake is then completed and the application protocol is enabled between the client device and the authentication service.

At 618, the client device communicates a security token request directed to the authentication service, and the security token request is communicated through the network interface device or via an alternate communication link to the authentication service. At 620, the authentication service replies to the client device with an encrypted token that includes a response to the security token request and a proof key, which is stored by the client device. The encrypted token is communicated through the network interface device or via an alternate communication link to the client device.

At 622, the client device communicates the encrypted token and a random number (e.g., a Nonce) to the network interface device. At 624, the network interface device communicates a validation request to the network authorization service, and the validation request includes an encrypted security token (which contains both the encrypted token and the proof key), the random number, and identification of the network interface device. At 626, the network authorization service validates the encrypted token and communicates a master session key to the network interface device, where the validation indicates to the network interface device that the client device is allowed access to the secure network. At 628, the network interface device communicates an EAP Success message to the client device, and network access is granted to the client device.

Figure 7:
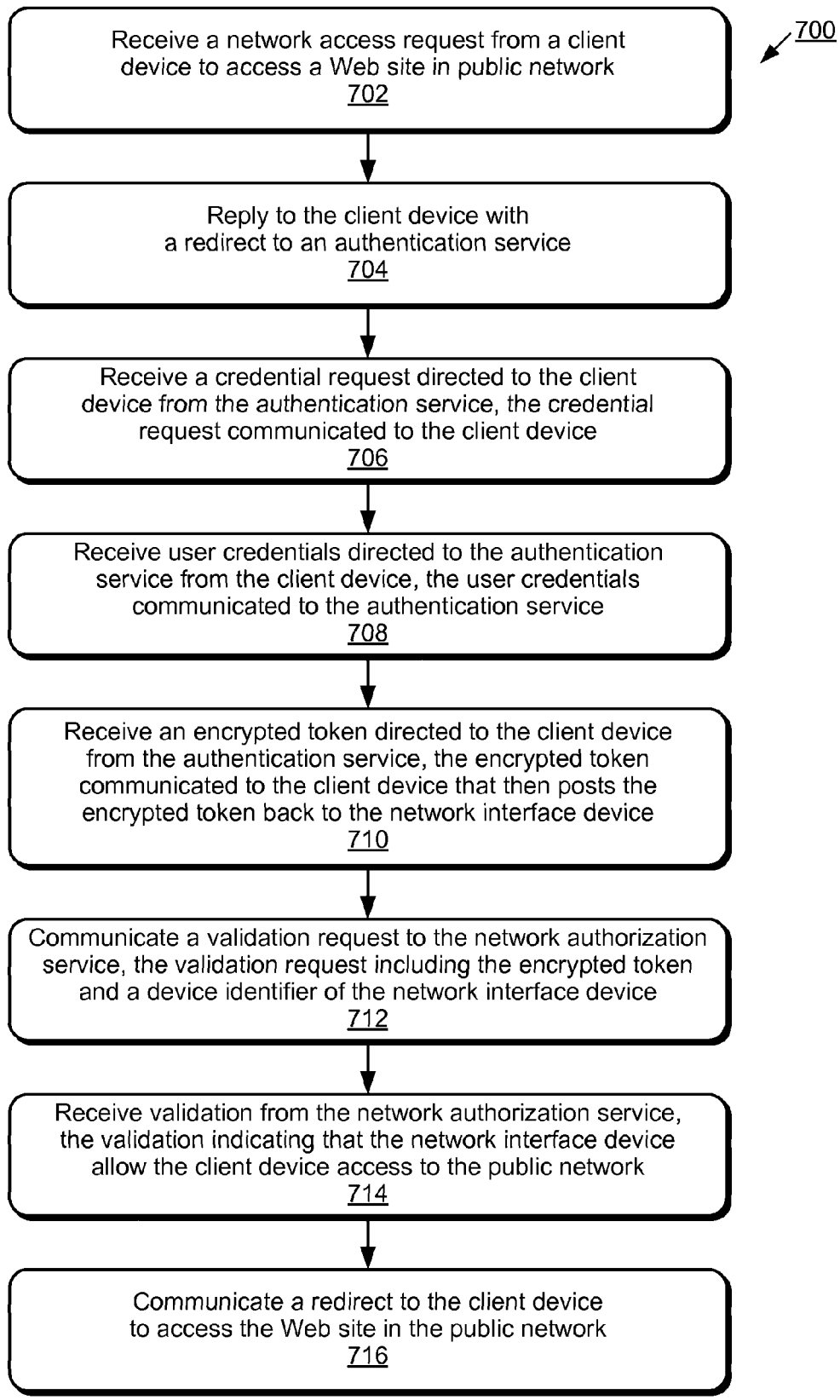
FIG. 7 illustrates example method(s) of registration and network access control in accordance with one or more embodiments.

FIG. 7 illustrates example method(s) 700 of registration and network access control, and is described with reference to a network interface device and network access for a client device utilizing a universal access method (UAM). The order in which the method blocks are described are not intended to be construed as a limitation, and any number of the described method blocks can be combined in any order to implement a method, or an alternate method.

At block 702, a network access request is received from a client device to access a Web site in public network. For example, the network interface device 402 receives a network access request from the client device 102 to access a Web site in a public network 112. In a captive portal implementation, the client device connects to the network via the network interface device, and a DHCP server on the network interface device applies a firewall rule to restrict network access after issuing a network address. When the client device requests access to a Web site on the Internet, the firewall blocks the request.

At block 704, a reply is communicated to the client device as a redirect to an authentication service. For example, the network interface device 402 redirects the request from the client device to the authentication service 110 with a URL, and requests a security token on behalf of a user of the client device from the authentication service. At block 706, a credential request directed to the client device is received from the authentication service, and the credential request is communicated to the client device. For example, the network interface device 402 receives a credential request directed to the client device 102 from the authentication service 110. The network interface device communicates the credential request to the client device, or the credential request is communicated to the client device via an alternate communication link.

At block 708, user credentials directed to the authentication service are received from the client device, and the user credentials are communicated to the authentication service. For example, the network interface device 402 receives the user credentials 132 directed to the authentication service 110 from the client device, and the user credentials are communicated to the authentication service. The user credentials can include a username and password combination utilized for authentication by the authentication service. The user credentials are also associated with a unique device identifier 120 for the network interface device 402 in the access control list 410 that is maintained at the network authorization service 116.

At block 710, an encrypted token directed to the client device is received from the authentication service, and the encrypted token is communicated to the client device that then posts the encrypted token back to the network interface device. For example, the network interface device 402 receives an encrypted token directed to the client device 102 from the authentication service 110 that authenticates a user of the client device based on the user credentials 132. The encrypted token is communicated to the client device that then posts the encrypted token back to the network interface device. In an implementation, the authentication service 110 issues a claim token in response (the claim token encrypted for the network authorization service 116), and a script automatically redirects the client browser to post the encrypted token to a captive portal daemon on the network interface device. The post can be over an unencrypted channel, however the token is already encrypted for the relying entity.

At block 712, a validation request is communicated to the network authorization service, the validation request including the encrypted token and a device identifier of the network interface device. For example, the network interface device 402 communicates a validation request to the network authorization service 116, and the validation request includes the device identifier 408 and the encrypted token (e.g., received from the authentication service 110 and posted by the client device at block 710).

At block 714, validation is received from the network authorization service, the validation indicating that the network interface device allow the client device access to the public network. For example, the network interface device 402 receives a validation decision from the network authorization service 116, and the validation authorizes the client device to the network interface device and indicates that the client device 102 can access the public network. The network authorization service decrypts the encrypted token and performs an access check of the access control list 410 to determine whether the network interface device is authorized to be on the network, and the client device is authorized to the network interface device. For example, a hotspot provider does not have to create temporary username and password for a visitor that can instead authenticate directly to the network interface device.

At block 716, a redirect is communicated to the client device to access the Web site in the public network. For example, the network interface device 402 communicates a redirect to the client device 102 to access the initially requested Web site in the public network. The client device is now authenticated to the network interface device without temporary credentials.

Figure 8:
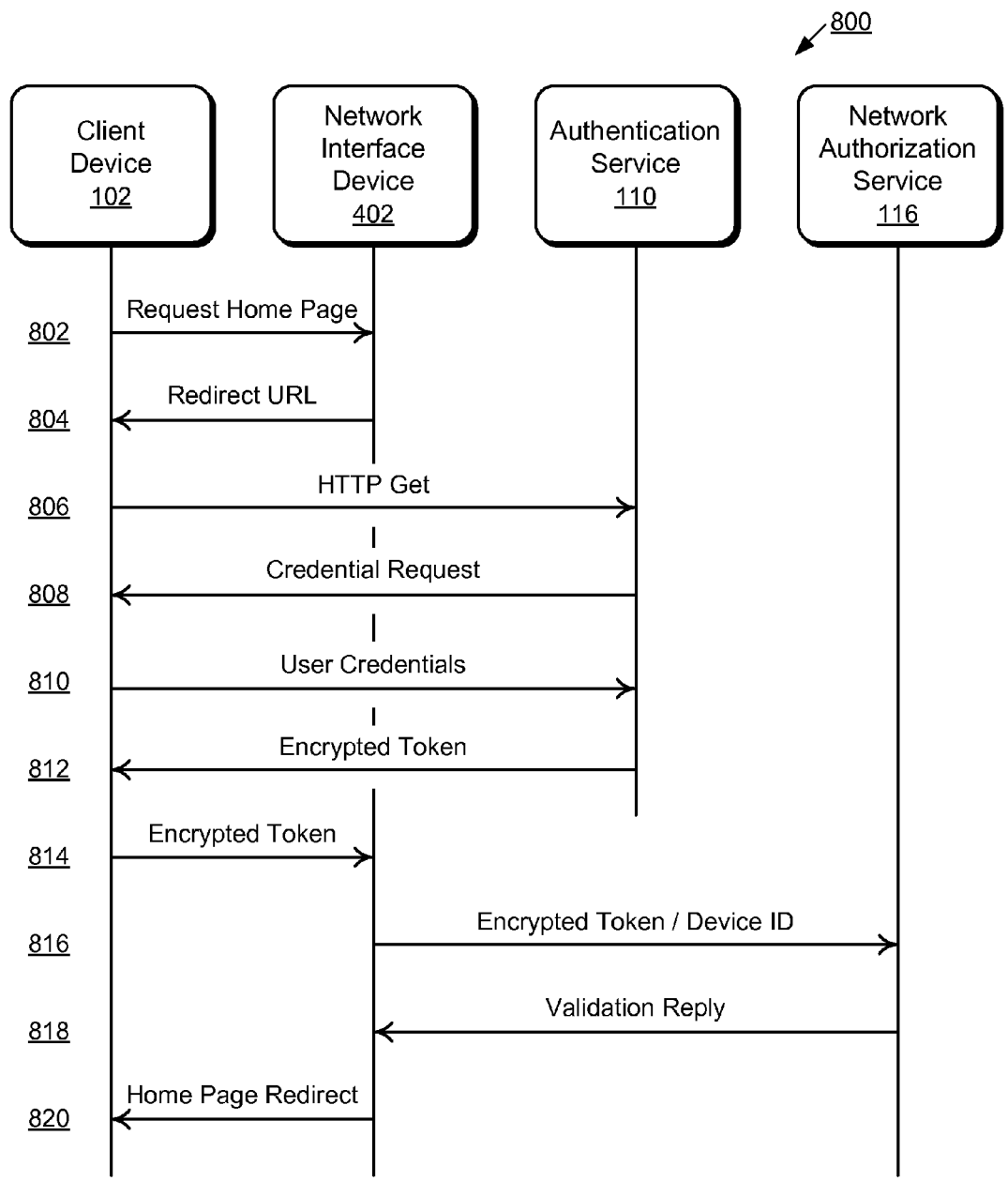
FIG. 8 is an example diagram that further illustrates data communication between devices and services described with reference to FIGS. 4 and 7 in accordance with one or more embodiments.

FIG. 8 is an example diagram 800 that further illustrates the data communication between the various devices and services described with reference to FIGS. 4 and 7. The example diagram includes the client device 102, the network interface device 402, the authentication service 110, and the network authorization service 116, as well as a sequence of the data communication between the devices and services for client device network access utilizing a universal access method (UAM).

At 802, the client device communicates a network access request to the network interface device, such as in the form of a request for a Web page. At 804, the network interface device redirects the request from the client device to the authentication service with a URL. At 806, the client device communicates the redirected request as an HTTP Get to the authentication service. At 808, the authentication service communicates a credential request directed to the client device, and the credential request is passed through the network interface device. At 810, the client device communicates user credentials as an HTTPS Post to the authentication service, and the user credentials are passed through the network interface device.

At 812, the authentication service authenticates the user credentials and communicates an encrypted token as an HTTP Response to the client device, and the encrypted token is passed through the network interface device to the client device as a redirect message posted back to the network interface device. At 814, the client device communicates the redirected encrypted token as an HTTP Post to the network interface device.

At 816, the network interface device communicates a validation request to the network authorization service, and the validation request includes the encrypted token and identification of the network interface device (e.g., a Device ID). At 818, the network authorization service replies to the network interface device with a validation that indicates to allow the client device access to the public network. At 820, the network interface device communicates a redirect to the client device to access the initially requested Web site in the public network.

Figure 9:
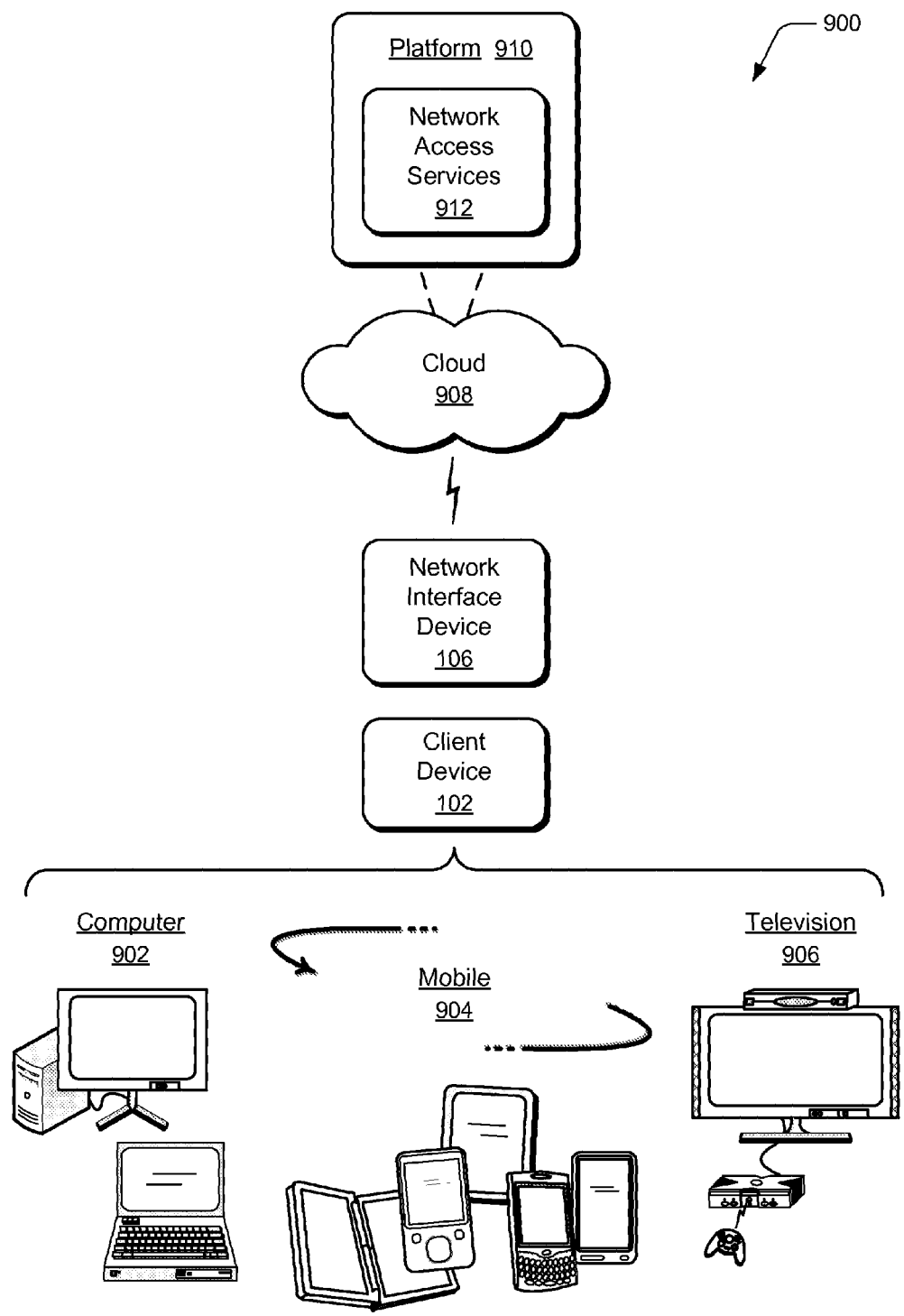
FIG. 9 illustrates an example system with multiple devices for a seamless user experience in ubiquitous environments.

FIG. 9 illustrates an example system 900 that includes the client device 102 and network interface device 106 as described with reference to FIG. 1 (and may include the network interface device 402 as described with reference to FIG. 4). The example system 900 enables ubiquitous environments for a seamless user experience when using any type of computer, television, and/or mobile device. Services and applications run substantially similar in all environments for a common user experience when transitioning from one device to the next while utilizing an application, playing a video game, watching a video, listening to music, and so on.

In the example system 900, multiple devices can be interconnected through a central computing device, which may be local to the multiple devices or may be located remotely from the multiple devices. In one embodiment, the central computing device may be a cloud of one or more server computers that are connected to the multiple devices through a network, the Internet, or other data communication link. In embodiments, this interconnection architecture enables functionality across multiple devices to provide a common and seamless experience to a user of the multiple devices. Each of the devices may have different physical requirements and capabilities, and the central computing device uses a platform to enable delivery of an experience that is both tailored to a particular device and yet common to all of the devices. In one embodiment, a class of target devices is created and user experiences are tailored to the generic class of devices. A class of devices may be defined by physical features, types of usage, or other common characteristics of the devices.

In various implementations, the client device 102 may be implemented in a variety of different configurations, such as for computer 902, mobile 904, and television 906 uses. Each of these configurations includes devices that may have generally different constructs and capabilities, and the client device may be configured according to one or more of the different device classes. For example, the client device may be implemented as any type of a personal computer, desktop computer, a multi-screen computer, laptop computer, tablet, netbook, and so on.

The client device 102 may also be implemented as any type of mobile device, such as a mobile phone, portable music player, portable gaming device, a tablet computer, a multi-screen computer, and so on. The client device may also be implemented as any type of television device having or connected to generally larger screens in casual viewing environments. These devices include televisions, set-top boxes, gaming consoles, and so on. The techniques described herein may be supported by these various configurations of the client device and are not limited to the specific examples of registration and network access control described herein.

The cloud 908 includes and/or is representative of a platform 910 for network access services 912. The platform abstracts underlying functionality of hardware, such as server devices, and/or software resources of the cloud. The network access services may include applications and/or data that can be utilized while computer processing is executed on servers that are remote from the client device. For example, the network access services may include the network access control service 108, the authentication service 110, the device management service 114 and/or the network authorization service 116 as described with reference to any of the FIGS. 1-8. The network access services 912 can be provided as a service over the Internet and/or through a subscriber network, such as a cellular or WiFi network.

Figure 10:
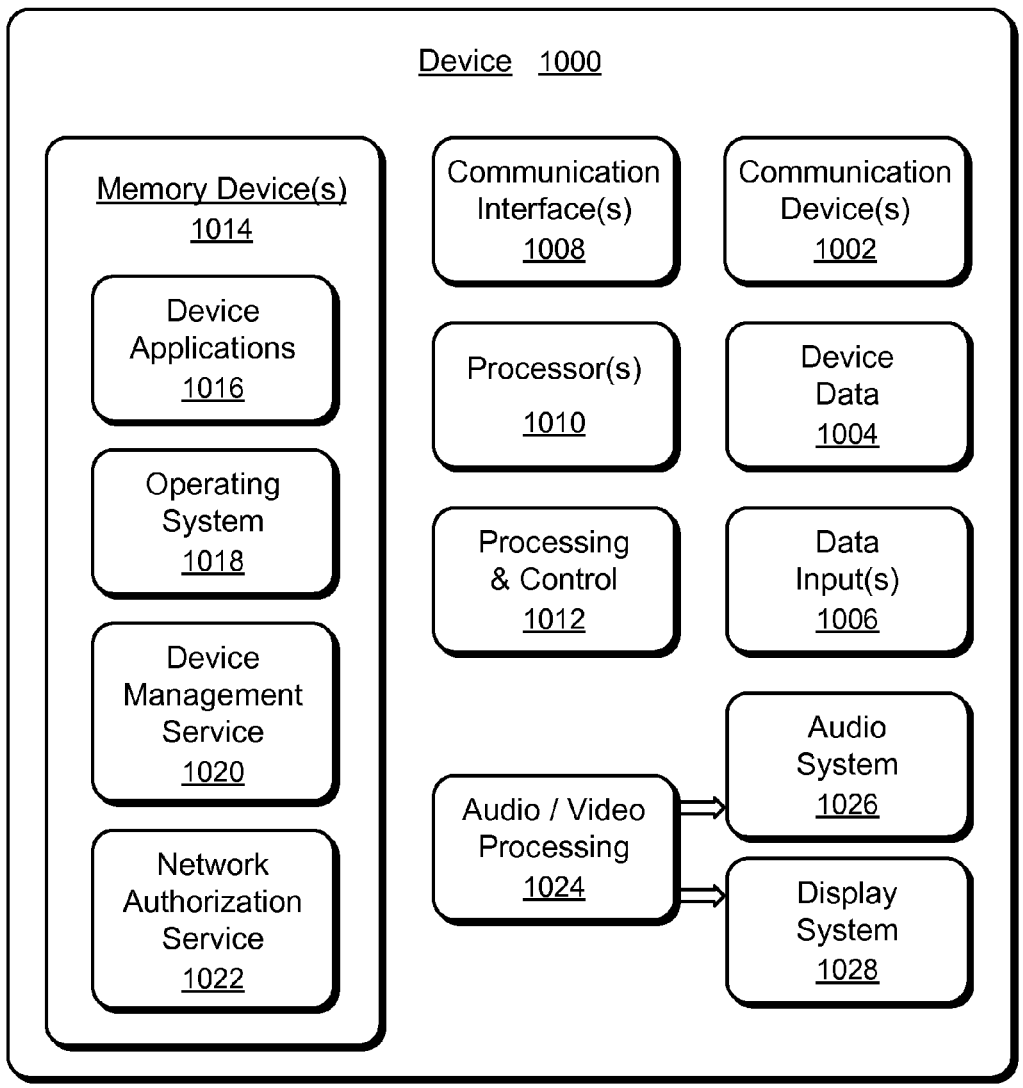
FIG. 10 illustrates various components of an example device that can implement embodiments of registration and network access control.

FIG. 10 illustrates various components of an example device 1000 that can be implemented as any of the devices, or services implemented by devices, described with reference to the previous FIGS. 1-9. In embodiments, the device may be implemented as any one or combination of a fixed or mobile device, in any form of a consumer, computer, server, network interface, portable, user, communication, phone, navigation, television, appliance, gaming, media playback, and/or electronic device. The device may also be associated with a user (i.e., a person) and/or an entity that operates the device such that a device describes logical devices that include users, software, firmware, hardware, and/or a combination of devices.

The device 1000 includes communication devices 1002 that enable wired and/or wireless communication of device data 1004, such as received data, data that is being received, data scheduled for broadcast, data packets of the data, etc. The device data or other device content can include configuration settings of the device, media content stored on the device, and/or information associated with a user of the device. Media content stored on the device can include any type of audio, video, and/or image data. The device includes one or more data inputs 1006 via which any type of data, media content, and/or inputs can be received, such as user-selectable inputs, messages, communications, music, television content, recorded video content, and any other type of audio, video, and/or image data received from any content and/or data source.

The device 1000 also includes communication interfaces 1008, such as any one or more of a serial, parallel, network, or wireless interface. The communication interfaces provide a connection and/or communication links between the device and a communication network by which other electronic, computing, and communication devices communicate data with the device.

The device 1000 includes one or more processors 1010 (e.g., any of microprocessors, controllers, and the like) which process various computer-executable instructions to control the operation of the device. Alternatively or in addition, the device can be implemented with any one or combination of software, hardware, firmware, or fixed logic circuitry that is implemented in connection with processing and control circuits which are generally identified at 1012. Although not shown, the device can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

The device 1000 also includes one or more memory devices (e.g., computer-readable storage media) 1014 that enable data storage, such as random access memory (RAM), non-volatile memory (e.g., read-only memory (ROM), flash memory, etc.), and a disk storage device. A disk storage device may be implemented as any type of magnetic or optical storage device, such as a hard disk drive, a recordable and/or rewriteable disc, and the like. The device may also include a mass storage media device.

Computer readable media can be any available medium or media that is accessed by a computing device. By way of example, and not limitation, computer readable media may comprise storage media and communication media. Storage media include volatile and non-volatile, removable and non-removable media implemented in any method or technology for storage of information, such as computer-readable instructions, data structures, program modules, or other data. Storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by a computer.

Communication media typically embody computer-readable instructions, data structures, program modules, or other data in a modulated data signal, such as carrier wave or other transport mechanism. Communication media also include any information delivery media. The term modulated data signal means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

A memory device 1014 provides data storage mechanisms to store the device data 1004, other types of information and/or data, and various device applications 1016. For example, an operating system 1018 can be maintained as a software application with a memory device and executed on the processors. The device applications may also include a device manager, such as any form of a control application, software application, signal processing and control module, code that is native to a particular device, a hardware abstraction layer for a particular device, and so on.

In this example, the device applications 1016 include a device management service 1020 and a network authorization service 1022, such as when the device 1000 is implemented as a network access control service. The device management service and the network authorization service are shown as software modules and/or computer applications. Alternatively or in addition, the device management service and/or the network authorization service can be implemented as hardware, software, firmware, fixed logic, or any combination thereof.

The device 1000 also includes an audio and/or video processing system 1024 that generates audio data for an audio system 1026 and/or generates display data for a display system 1028. The audio system and/or the display system may include any devices that process, display, and/or otherwise render audio, video, display, and/or image data. Display data and audio signals can be communicated to an audio device and/or to a display device via an RF (radio frequency) link, S-video link, composite video link, component video link, DVI (digital video interface), analog audio connection, or other similar communication link. In implementations, the audio system and/or the display system are external components to the device. Alternatively, the audio system and/or the display system are integrated components of the example device.

Although embodiments of registration and network access control have been described in language specific to features and/or methods, the subject of the appended claims is not necessarily limited to the specific features or methods described. Rather, the specific features and methods are disclosed as example implementations of registration and network access control.

The invention claimed is:

1. A computer-implemented method at a network interface device, the method comprising:
   initiating registration of the network interface device with a device management service to initially configure the network interface device as an interface to a public network for a client device;
   receiving an encrypted token directed to the client device from an authentication service that authenticates user credentials received from the client device;
   passing the encrypted token to the client device, the encrypted token redirected to the device management service;
   receiving a device management information request directed to the client device from the device management service, the device management information request communicated to the client device;
   receiving identification of the network interface device from the client device in response to the device management information request, the identification of the network interface device communicated to the device management service;
   receiving encrypted management data directed to the client device from the device management service, the encrypted management data communicated to the client device;
   receiving the encrypted token and the encrypted management data from the client device;
   posting the encrypted token, the encrypted management data, and the identification of the network interface device to the device management service that registers the network interface device and generates a unique device identifier corresponding to the network interface device; and
   receiving the unique device identifier for the network interface device from the device management service.

2. A computer-implemented method as recited in claim 1, wherein said initiating registration of the network interface device further comprises:
   receiving a request from the client device to connect to the public network;
   redirecting the request from the client device to the authentication service;
   receiving a credential request directed to the client device from the authentication service, the credential request communicated to the client device; and
   receiving user credentials directed to the authentication service from the client device, the user credentials communicated to the authentication service.

3. A computer-implemented method as recited in claim 1, further comprising restricting the client device access to the public network through the network interface device until the network interface device is configured and registered with the device management service.

4. A computer-implemented method as recited in claim 1, wherein the user credentials include a username and password combination utilized for authentication by the authentication service.

5. A computer-implemented method as recited in claim 1, wherein the user credentials are associated with the unique device identifier for the network interface device at the device management service.

6. A computer-implemented method as recited in claim 1, wherein the encrypted management data is generated by the device management service and subsequently utilized by the device management service to authenticate the network interface device when the network interface device posts the encrypted management data back to the device management service.

7. A computer-implemented method as recited in claim 1, wherein the identification of the network interface device comprises at least one of a device identifier or a security identifier corresponding to the network interface device, the identification communicated from the client device to the device management service via the network interface device.

8. A computer-implemented method as recited in claim 1, wherein the identification of the network interface device comprises configuration settings of the network interface device, the configuration settings communicated from the client device to the device management service via the network interface device.

9. A network interface device, comprising:
   one or more communication interfaces configured for network and device communication;
   a processor system to implement a device application configured to:
      initiate registration of the network interface device with a device management service to initially configure the network interface device as an interface to a public network for a client device;
      receive an encrypted token directed to the client device from an authentication service that authenticates user credentials received from the client device;
      pass the encrypted token to the client device, the encrypted token redirected to the device management service;
      receive a device management information request directed to the client device from the device management service, the device management information request communicated to the client device;
      receive identification of the network interface device from the client device in response to the device management information request, the identification of the network interface device communicated to the device management service;

receive encrypted management data directed to the client device from the device management service, the encrypted management data communicated to the client device;

receive the encrypted token and the encrypted management data from the client device;

post the encrypted token, the encrypted management data, and the identification of the network interface device to the device management service that registers the network interface device and generates a unique device identifier corresponding to the network interface device; and receive the unique device identifier for the network interface device from the device management service.

10. A network interface device as recited in claim 9, wherein to initiate registration of the network interface device comprises the device application configured to:

receive a request from the client device to connect to the public network;

redirect the request from the client device to the authentication service;

receive a credential request directed to the client device from the authentication service, the credential request communicated to the client device; and receive user credentials directed to the authentication service from the client device, the user credentials communicated to the authentication service.

11. A network interface device as recited in claim 9, wherein the device application is configured to restrict the client device access to the public network through the network interface device until the network interface device is configured and registered with the device management service.

12. A network interface device as recited in claim 9, wherein the user credentials include a username and password combination utilized for authentication by the authentication service.

13. A network interface device as recited in claim 9, wherein the user credentials are associated with the unique device identifier for the network interface device at the device management service.

14. A network interface device as recited in claim 9, wherein the encrypted management data is generated by the device management service and subsequently utilized by the device management service to authenticate the network interface device when the network interface device posts the encrypted management data back to the device management service.

15. A network interface device as recited in claim 9, wherein the identification of the network interface device comprises at least one of a device identifier or a security identifier corresponding to the network interface device, the identification communicated from the client device to the device management service via the network interface device.

16. A network interface device as recited in claim 9, wherein the identification of the network interface device comprises configuration settings of the network interface device, the configuration settings communicated from the client device to the device management service via the network interface device.

17. A computer-readable storage memory comprising stored instructions that are executable and, responsive to execution of the instructions by a network interface device, the network interface device performs operations to:

initiate registration of the network interface device with a device management service to initially configure the network interface device as an interface to a public network for a client device;

receive an encrypted token directed to the client device from an authentication service that authenticates user credentials received from the client device;

pass the encrypted token to the client device, the encrypted token redirected to the device management service;

receive a device management information request directed to the client device from the device management service, the device management information request communicated to the client device;

receive identification of the network interface device from the client device in response to the device management information request, the identification of the network interface device communicated to the device management service;

receive encrypted management data directed to the client device from the device management service, the encrypted management data communicated to the client device;

receive the encrypted token and the encrypted management data from the client device;

post the encrypted token, the encrypted management data, and the identification of the network interface device to the device management service that registers the network interface device and generates a unique device identifier corresponding to the network interface device; and receive the unique device identifier for the network interface device from the device management service.

18. The computer-readable storage memory as recited in claim 17, wherein to said initiate registration of the network interface device, the network interface device further performs the operations comprising to:

receive a request from the client device to connect to the public network;

redirect the request from the client device to the authentication service;

receive a credential request directed to the client device from the authentication service, the credential request communicated to the client device; and receive user credentials directed to the authentication service from the client device, the user credentials communicated to the authentication service.

19. The computer-readable storage memory as recited in claim 17, wherein the network interface device further performs the operations comprising to restrict the client device access to the public network through the network interface device until the network interface device is configured and registered with the device management service.

20. The computer-readable storage memory as recited in claim 17, wherein the encrypted management data is generated by the device management service and subsequently utilized by the device management service to authenticate the network interface device when the network interface device posts the encrypted management data back to the device management service.

* * * * *